US009803527B2

(12) United States Patent
Pappenheimer et al.

(10) Patent No.: US 9,803,527 B2
(45) Date of Patent: Oct. 31, 2017

(54) METHOD FOR COLD-START PRE-WARMING OF A PRESSURE-CHARGED INTERNAL COMBUSTION ENGINE AND/OR OF AN EXHAUST GAS AFTERTREATMENT DEVICE

(71) Applicant: MAN Truck & Bus AG, München (DE)

(72) Inventors: Andreas Pappenheimer, Nürnberg (DE); Andreas Sommermann, Heilsbronn (DE)

(73) Assignee: MAN TRUCK & BUS AG, Munich (DE)

( * ) Notice: Subject to any disclaimer, the term of this patent is extended or adjusted under 35 U.S.C. 154(b) by 177 days.

(21) Appl. No.: 14/951,006

(22) Filed: Nov. 24, 2015

(65) Prior Publication Data

US 2016/0153332 A1    Jun. 2, 2016

(30) Foreign Application Priority Data

Nov. 28, 2014 (DE) .................. 10 2014 017 676

(51) Int. Cl.

| | |
|---|---|
| *F01N 3/20* | (2006.01) |
| *F02D 41/02* | (2006.01) |
| *F02D 41/06* | (2006.01) |
| *F02B 39/10* | (2006.01) |
| *F02D 13/02* | (2006.01) |
| *F02D 41/00* | (2006.01) |
| *F02B 33/44* | (2006.01) |
| *F02N 19/06* | (2010.01) |
| *F02B 33/40* | (2006.01) |

(Continued)

(52) U.S. Cl.
CPC .......... *F01N 3/2006* (2013.01); *F02B 25/145* (2013.01); *F02B 33/40* (2013.01);
(Continued)

(58) Field of Classification Search
CPC .......... F02B 37/00; F02B 37/04; F02B 37/10; F02B 37/11; F02B 33/443; F02B 33/446; F02B 39/00; F02B 39/10; F02D 13/0261
See application file for complete search history.

(56) References Cited

U.S. PATENT DOCUMENTS 4,233,815 A * 11/1980 Melchior .............. F02B 37/013
                                                    60/606
5,398,502 A *  3/1995 Watanabe ........... F01L 13/0015
                                                  123/90.15

(Continued)

FOREIGN PATENT DOCUMENTS

DE        4441164 A1    5/1996

*Primary Examiner* — Thomas Moulis
(74) *Attorney, Agent, or Firm* — Lucas & Mercanti, LLP

(57) ABSTRACT

A method for cold start pre-warming of a pressure-charged internal combustion engine and/or of an exhaust gas aftertreatment device of a internal combustion engine, includes arranging a cold-starting aid in the intake duct for warming the charge air while the engine is stationary. The internal combustion engine has at least one working cylinder with at least one inlet valve and at least one outlet valve and further includes a device for setting a valve position. The internal combustion engine can be pressure-charged by a pressure-charging device operable by an electric motor. In the method, after detection of a cold start of the internal combustion engine: the cold-starting aid is activated while the engine is stationary; electric-motor operation of the pressure-charging device is activated; and a valve overlap between at least one inlet valve and at least one outlet valve is set.

12 Claims, 3 Drawing Sheets

(51) Int. Cl.
*F02B 37/10* (2006.01)
*F02B 37/11* (2006.01)
*F02B 25/14* (2006.01)
*F02M 31/08* (2006.01)
*F02M 31/13* (2006.01)
*F02D 41/04* (2006.01)
*F02N 19/00* (2010.01)

(52) U.S. Cl.
CPC ............ *F02B 33/443* (2013.01); *F02B 37/10* (2013.01); *F02B 37/11* (2013.01); *F02B 39/10* (2013.01); *F02D 13/0219* (2013.01); *F02D 13/0261* (2013.01); *F02D 41/0002* (2013.01); *F02D 41/0007* (2013.01); *F02D 41/024* (2013.01); *F02D 41/064* (2013.01); *F02M 31/08* (2013.01); *F02M 31/13* (2013.01); *F02N 19/06* (2013.01); *F02D 41/042* (2013.01); *F02D 2041/001* (2013.01); *F02N 19/004* (2013.01); *Y02T 10/126* (2013.01); *Y02T 10/144* (2013.01); *Y02T 10/18* (2013.01); *Y02T 10/26* (2013.01); *Y02T 10/42* (2013.01)

(56) References Cited

U.S. PATENT DOCUMENTS

| | | | |
|---|---|---|---|
| 5,706,790 A | 1/1998 | Kemmler | |
| 6,276,334 B1 * | 8/2001 | Flynn | F02B 19/14 123/435 |
| 6,363,721 B1 * | 4/2002 | Prenninger | F02B 33/44 123/545 |
| 6,769,411 B2 * | 8/2004 | Fabiani | F02D 41/0007 123/478 |
| 7,155,899 B2 * | 1/2007 | Beer | F01N 3/2006 123/90.15 |
| 8,061,311 B2 * | 11/2011 | Nakamura | F01L 1/3442 123/90.15 |
| 8,272,362 B2 * | 9/2012 | Shane | F02D 41/0002 123/299 |
| 8,561,394 B2 * | 10/2013 | Porten | F01N 3/0842 30/280 |
| 8,789,368 B2 * | 7/2014 | Kuhlbach | F01D 25/14 417/409 |
| 9,010,114 B2 * | 4/2015 | Krug | F02B 29/0412 60/605.1 |
| 9,127,626 B2 * | 9/2015 | Banker | F02M 31/042 |
| 9,410,509 B2 * | 8/2016 | Roth | F02M 31/042 |
| 9,512,798 B2 * | 12/2016 | Zeng | F02D 41/3094 |
| 9,644,573 B2 * | 5/2017 | Dale | F02M 26/04 |
| 2002/0134081 A1 * | 9/2002 | Shiraishi | F01N 3/28 60/602 |
| 2003/0182931 A1 * | 10/2003 | Sonoda | F01L 1/34 60/284 |
| 2005/0000217 A1 * | 1/2005 | Nau | F01N 3/2006 60/612 |
| 2005/0097888 A1 * | 5/2005 | Miyashita | F02D 41/0007 60/602 |
| 2010/0300405 A1 * | 12/2010 | Uhrich | F02B 33/40 123/435 |

* cited by examiner

METHOD FOR COLD-START PRE-WARMING OF A PRESSURE-CHARGED INTERNAL COMBUSTION ENGINE AND/OR OF AN EXHAUST GAS AFTERTREATMENT DEVICE

CROSS-REFERENCE TO RELATED APPLICATIONS

The present application claims priority of DE 10 2014 017676.2 filed Nov. 28, 2014, which is incorporated herein by reference.

BACKGROUND OF THE INVENTION

The invention relates to a method for cold-start pre-warming of a pressure-charged internal combustion engine and/or of an exhaust gas aftertreatment device of a pressure-charged internal combustion engine. The invention furthermore relates to a motor vehicle, in particular a commercial vehicle, having a pressure-charged internal combustion engine, an exhaust gas aftertreatment device and a device for cold-start pre-warming of the pressure-charged internal combustion engine and/or of an exhaust gas aftertreatment device.

The fact that pollutant emissions from an internal combustion engine can be reduced in an effective manner by catalytic aftertreatment of the exhaust gas with the aid of an exhaust gas aftertreatment system, e.g., one having an exhaust gas catalyst, is known from practical experience. However, it is an important precondition for this that the catalyst has reached its light off temperature. Below this temperature, the exhaust gas catalyst is ineffective or not very effective, and the reaction takes place only at insufficiently low conversion rates.

In systems with exhaust gas turbocharging, reaching catalyst light off in an optimum manner for emissions is critical, owing to the heatsink provided by the exhaust turbine. In the case of internal combustion engines of this kind, it is thus necessary to take precautions to ensure that the exhaust gas catalyst reaches its light off temperature quickly when cold starting.

Use is frequently made of secondary air systems to limit cold starting emissions. In this case, secondary air is injected close to the outlet valves during warmup, e.g., by means of a secondary air pump. By means of the reaction of the injected air with the unburnt exhaust gas constituents contained in the hot exhaust gases and further oxidation in the catalyst, the catalyst is heated up more quickly.

For this purpose, DE 44 41 164 A1 proposes, for example, to deliver the charge air to the internal combustion engine via a charge air line and to arrange a throttle valve inside this charge air line. A recirculated air line leading to the inlet side of the charger branches off upstream of the throttle valve and downstream of the charger. A recirculated air adjuster is arranged in the recirculated air line. A connecting line leads from the pressure side of the charger to an exhaust line of the internal combustion engine, wherein a control valve connected to an engine control unit is arranged in the connecting line.

The disadvantage with the previously known approaches is that additional components, e.g., a secondary air pump, a recirculated air line, a recirculated air adjuster, and a throttle valve have to be provided.

Cold-starting aids for preheating the combustion air in the form of a flame-starting device or of a glow plug, which are arranged in the intake air duct of the combustion device, are furthermore known in practice. In particular, a cold-starting aid of this kind serves to allow cold starting of internal combustion engines, e.g., diesel engines or spark-ignition engines, with or without charge air. It is used, particularly in the case of diesel engines, such as direct injection diesel engines for use on trucks, to ensure reliable starting of the engine at low temperatures of, for example, below −10° C. The disadvantage with these cold-starting aids is that the warming effect is restricted to the charge air temperature and that there is no heating of the cylinders or of the exhaust gas aftertreatment device.

BRIEF SUMMARY OF THE INVENTION

An object of the invention is to provide an improved method for cold-start pre-warming of a pressure-charged internal combustion engine and/or of an exhaust gas aftertreatment device that avoids disadvantages of conventional techniques.

According to general aspects of the invention, a method for cold-start pre-warming of a pressure-charged internal combustion engine and/or of an exhaust gas aftertreatment device of the pressure-charged internal combustion engine is proposed. In particular, the method relates to a method for cold-start pre-warming while the engine is stationary and to a method for cold-start pre-warming immediately before or during the execution of a cold start of a pressure-charged internal combustion engine.

In this case, in accordance with the prior art, a cold-starting aid is arranged in the intake duct for the purpose of warming the charge air while the engine is stationary. The cold-starting aid can be a flame-starting device or a glow-type device, e.g., a glow plug or glow grid. The internal combustion engine can be pressure-charged by a pressure-charging device that can be operated by electric motor and can thus also be pressure-charged while the engine is stationary or while the internal combustion engine is not being ignited. The internal combustion engine furthermore comprises at least one working cylinder, which in each case has at least one inlet valve, which is connected to the intake duct, and at least one outlet valve, which is connected to an exhaust system. A device for setting a valve position is furthermore provided. The device can set the valve position by rotating the crankshaft and/or, where present, activating a camshaft phase adjuster.

In the method for cold-start pre-warming, the following steps are carried out after detection of a cold start of the internal combustion engine: activating the cold-starting aid while the engine is stationary, activating electric-motor operation of the pressure-charging device, and setting of a valve overlap and/or of a charge-exchange position between at least one inlet valve and at least one outlet valve of a working cylinder in order to deliver at least some of the charge air delivered by the pressure-charging device directly into the exhaust system. Direct delivery of the charge air into the exhaust system is defined herein as delivery of the warmed charge air into the exhaust system with scavenging of a working cylinder and without an ignition process. In this case, no particular sequence of the three abovementioned steps is required. They can be started in succession or simultaneously.

Electric-motor operation of the pressure-charging device allows charge air to be delivered to the internal combustion engine and for it to be heated by the activated cold-starting aid, despite the engine being stationary and even without turbine energy from the combustion air of the internal combustion engine. Setting the valve overlap between at least one inlet valve and at least one outlet valve of a working cylinder has the effect that the heated charge air flows into the corresponding working cylinder with a valve overlap and is scavenged via the outlet valve to the exhaust side. In the case of the valve overlap, the inlet valve and the outlet valve are simultaneously partially open, with the result that there is scavenging of charge air entering via the inlet valve into the exhaust system. The working cylinder, on the one hand, and the exhaust gas aftertreatment system, in particular the exhaust gas aftertreatment catalyst, on the other hand, are thereby pre-warmed. It is thus possible to dispense with an additional recirculated air line leading to the inlet side of the charger or with additional secondary pumps that are required by the above-described prior art solutions.

After a pre-warming phase, e.g., after a predetermined time, starter actuation can then take place in order to start the engine. By virtue of the pre-warmed cylinder or cylinders, the internal combustion engine exhibits a better ignition behaviour or starting behaviour. By virtue of the pre-warmed exhaust gas aftertreatment device, the light off temperature is reached more quickly and pollutant emissions are reduced.

Here, the pressure-charging device that can be operated by electric motor is preferably embodied as an exhaust turbocharger with electric motor assistance. Such exhaust turbochargers with electric motor assistance are likewise known per se from the prior art and have an electrically driven nonpositive displacement compressor. In this case, auxiliary energy can be supplied in a time-limited manner and with the aid of an electric motor in transient mode, e.g., during the delayed pressure buildup at low speeds. One particular advantage is thus that the exhaust turbocharger can also be used to warm the working cylinders and the exhaust gas aftertreatment device, meaning that no additional pumps or electric compressors are needed. Another advantage is that the co-rotating turbine of the exhaust turbocharger assists the transfer of hot air to the exhaust gas aftertreatment system.

Within the scope of the invention, however, there is also the possibility, instead of an exhaust turbocharger with electric motor assistance, of providing an electric compressor which is driven exclusively by electric means and not via a turbine driven by the energy of the exhaust gas.

The device for setting the valve position can be designed to set at least one predetermined angular position of the crankshaft, which produces the valve overlap through co-rotation of the crankshaft and which, for the purpose of setting the angular position of the crankshaft, activates a starter motor of the internal combustion engine or a crankshaft starter generator. Furthermore, the device for setting the valve position can also be designed to twist the camshafts in such a way by means of a phase adjuster of the camshaft, where present, that a larger valve overlap is set.

Within the scope of the invention, there is the possibility here that, in the step of setting the valve overlap, the valve overlap and/or the charge-exchange position is in each case set in succession for the next working cylinder or cylinders to be ignited during the starting process.

This offers the advantage that the next cylinder to be ignited during the cold-starting process is selectively pre-warmed.

In the case of an internal combustion engine which is embodied as an in-line six-cylinder engine, one possibility of implementation according to the invention envisages that, in the step of setting the valve overlap, the crankshaft is turned three times or several times in succession, in each case by 120°, in order in each case to set one of two synchronized working cylinders to the charge-exchange top dead centre position. During a subsequent starting process, the next working cylinders to be ignited are as a result already preheated.

There is furthermore the possibility of that the valves are not driven via the camshaft but instead that the valve gear of the internal combustion engine is embodied as an electromagnetic valve gear, which is activated by the device for setting the valve position in order to set the valve overlap. Here too, there is furthermore once again the possibility of turning the camshaft by a phase adjuster in order to set a larger valve overlap.

In another embodiment of the invention, in the step of setting the valve overlap, a slow continuous crankshaft rotation takes place while the engine is stationary. The continuous crankshaft rotation likewise successively produces valve overlaps, with the result that at least some of the charge air delivered by the pressure-charging device is delivered directly into the exhaust system.

According to a preferred embodiment, the internal combustion engine operates with self-ignition and, in particular, is a diesel engine.

The presence of a cold-starting process can be detected, for example, if the coolant temperature or the intake air temperature when starting the internal combustion engine falls below a threshold value.

The invention furthermore relates to a motor vehicle, preferably a commercial vehicle, comprising an exhaust gas aftertreatment device; a cold-starting aid, arranged in the intake duct, for warming the charge air while the engine is stationary; a pressure-charged, preferably self-ignition, internal combustion engine having at least one working cylinder, which in each case has at least one inlet valve, which is connected to the intake duct, and at least one outlet valve, which is connected to an exhaust system; a pressure-charging device, which can be operated by electric motor, for pressure-charging the internal combustion engine; and a device for setting a valve position of the working cylinders of the internal combustion engine. According to general aspects of the invention, the motor vehicle furthermore comprises a control device for cold-start pre-warming of the pressure-charged internal combustion engine and/or of the exhaust gas aftertreatment device while the engine is stationary, which control device is designed to carry out the method as disclosed herein.

To avoid repetitions, features disclosed purely in terms of method shall be taken to be disclosed and to be claimable also in terms of a device.

BRIEF DESCRIPTION OF THE DRAWINGS

The above-described preferred embodiments and features of the invention can be combined with one another in any desired manner. Further details and advantages of the invention are described below with reference to the attached drawings, in which.

DETAILED DESCRIPTION OF THE PREFERRED EMBODIMENTS

Figure 1:
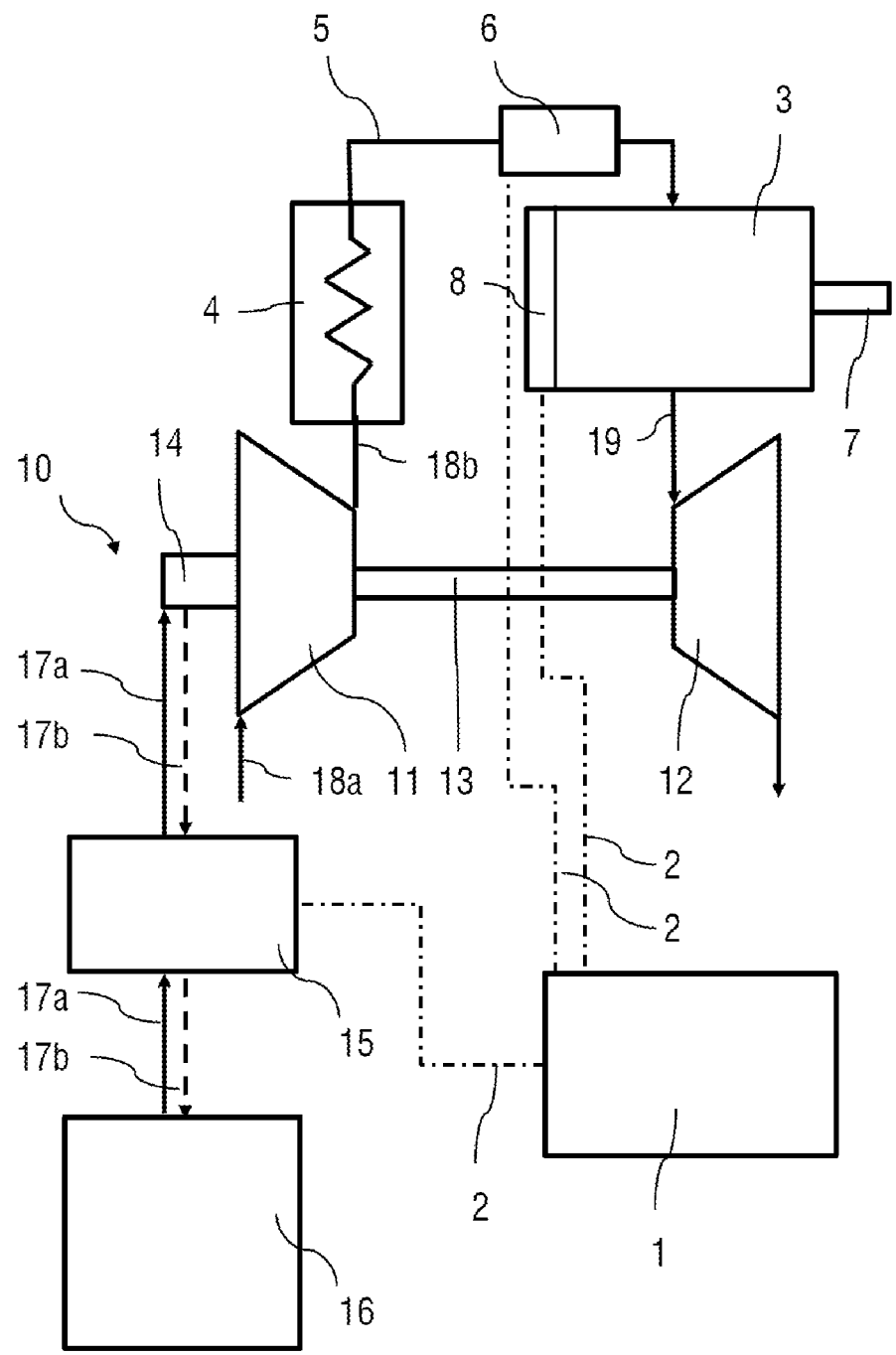
FIG. 1 is a schematic block diagram of an internal combustion engine having an exhaust turbocharger with electric motor assistance.

A pressure-charged diesel internal combustion engine 3 for a commercial vehicle and an associated exhaust turbocharger (ET) 10 with electric motor assistance are shown in FIG. 1 in the form of a block diagram. Here, only the components that are necessary for understanding the invention are illustrated. In particular, illustration of the exhaust gas aftertreatment device, the ignition system, the fuel circuit and the cooling circuit, which are in each case embodied in a manner known per se, have been dispensed with.

The exhaust turbocharger 10 with electric motor assistance comprises a turbine 12, which is driven by the exhaust gas from the internal combustion engine 3, which is fed to the turbine via the exhaust line 19. The turbine 12 is generally connected to a compressor 11 by a shaft 13, wherein the compressor 11 compresses charge air to be fed to the internal combustion engine 3 and thus increases the power of the internal combustion engine 3.

The ET 10 is embodied as an exhaust turbocharger with electric motor assistance. The special characteristic of this embodiment consists inter alia in that the electric motor drive of the nonpositive displacement compressor 11 is implemented by a small electric motor 14, which has been integrated into the compressor housing of the compressor 11. The electric motor 14 can be operated both as a motor and as a generator and, for this purpose, is controlled by a control device 15, which is furthermore connected to an electric energy storage device 16. By means of the power electronics of the control device 15, energy from the energy storage device 16 can be made available to the electric motor 14, illustrated by the solid lines 17a, or recovered energy from the operation of the ET can be fed to the energy storage device 16, illustrated by the dashed lines 17b. The exhaust turbocharger 10 is known per se from the prior art and is described on pages 50-55 of edition 3/2014 of the magazine "MTZ—Motortechnische Zeitschrift", for example. It is emphasized that other design embodiments of an exhaust turbocharger with electric motor assistance can also be used within the scope of the invention.

Via an intake duct 18a, the internal combustion engine 10 obtains the fresh air required for combustion. The fresh air is compressed beforehand in the compressor 11 and, in the illustrative embodiment under consideration, is fed via charge air line 18b to a charge air cooler 4 and then via charge air line 5 to the internal combustion engine 3. Arranged in charge air line 5 or the intake duct 18a there is furthermore a flame-starting device 6, by means of which the charge air can be heated in the case of a cold start. The fact that it is also possible to use a glow plug instead of the flame-starting device 6 has already been mentioned above.

To start the internal combustion engine, a conventional starter can be provided, which, to start the internal combustion engine, engages its starter pinion in a starter gearwheel coupled for conjoint rotation to the crankshaft and drives said gearwheel. As an alternative, as illustrated in a highly schematized way in FIG. 1, an electric machine which can be operated both as a motor and as a generator, in the form of an electric crankshaft starter generator (CSG) 8, which is generally arranged coaxially with the crankshaft 7 and between the internal combustion engine 3 and the transmission (not shown), can be provided to start the internal combustion engine. In this case, the CSG 8 is in operative connection with the crankshaft 7, e.g., by the rotor of the CSG 8 being connected for conjoint rotation in the assembled state to a flywheel arranged on the crankshaft 7. The CSG 8 is furthermore used to set the valve position in the context of cold-start pre-warming, this being explained below.

Also illustrated is a further control device 1, which can be embodied as part of the engine controller, for example. The control device is designed to activate the ET 10, the flame-starting device 6 and the CSG 8 (or the conventional starter) via appropriate control lines 2 as part of the method for cold-start pre-warming.

Figure 2:
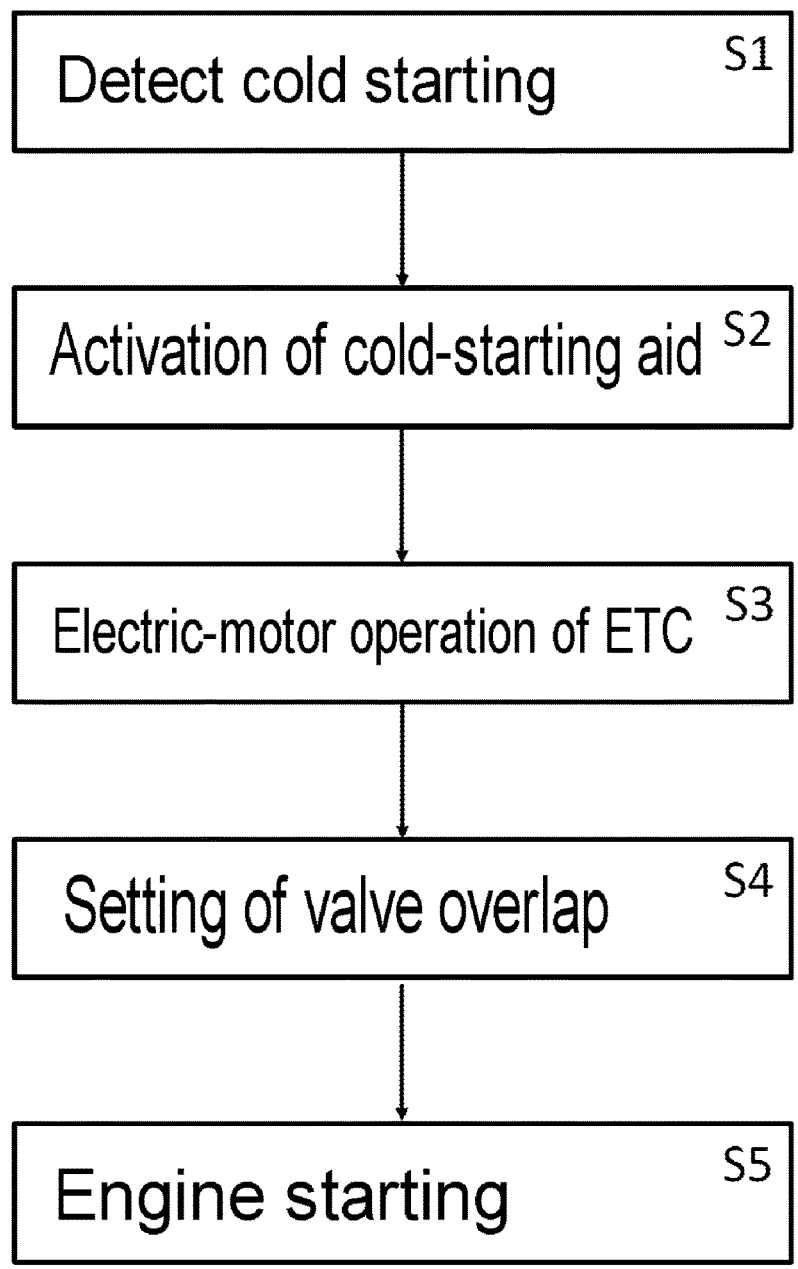
FIG. 2 is a flow diagram of the method for cold-start pre-warming according to one embodiment of the invention.

FIG. 2 shows a flow diagram of the method for cold-start pre-warming according to one embodiment of the invention.

Before cold-start pre-warming is carried out, the system determines whether cold starting of the vehicle is imminent. The presence of a cold-starting process can be determined by the approaches known from the prior art. Typically, a cold-starting process can be distinguished from a warm-starting process by means of the coolant temperature. If the coolant temperature falls below a predetermined threshold value when starting the internal combustion engine, for example, there is a cold start. The threshold value is determined experimentally and is stored in the storage device 1.

If cold starting of the internal combustion engine 3 is detected (step S1), the following steps are carried out. In step S2, the flame-starting device 6 is activated by the control device 1. The control device 1 furthermore controls the controller 15 of the ET 10 in step S3 in order to activate electric-motor operation of the ET 10. The compressor 11 is thus driven electrically and delivers charge air to the flame-starting device 6, whereby the latter is warmed.

In step S4, the inlet and outlet valves (not shown) of one or more cylinders of the internal combustion engine 3 are set to valve overlap. For this purpose, the programming of the control device 1 is designed in such a way that, in response to detection of cold starting in step S1, the rotor of the CSG 8 is energized in such a way that it moves automatically into a predetermined rotational position relative to the stator of the CSG. Here, the predetermined rotational position of the rotor corresponds to a predetermined rotational position, i.e., the angular position of the crankshaft 7 and hence of the camshaft or, in general, of the valve gear, in which at least one inlet valve and at least one outlet valve of at least one cylinder of the internal combustion engine 3 are set to valve overlap. The predetermined rotational position of the rotor is stored in a memory of the control device 1 and has been predetermined, e.g., experimentally.

By means of a position encoder (not shown) which operates inductively or capacitively and is known per se, the current rotational position of the rotor relative to the stator of the CSG and hence of the crankshaft 7 have been predetermined. From practical experience, it is known, for example, that detection of the rotational position of the rotor relative to the stator can be enabled by an additional cup-shaped or pot-shaped component (not shown) which is secured for conjoint rotation on the flywheel. Applied to the component is a special geometry or marking (encoder track), which is sensed by an inductively or capacitively operating sensor of the position encoder to determine the rotational position of the encoder track and hence of the rotor. By forming the difference between the predetermined rotational position and the actual rotational position, the control device 1 calculates the required rotation of the rotor to assume the predetermined rotational position for the valve overlap.

After the setting of the valve overlap, at least some of the charge air delivered by the compressor 11 driven by electric motor 14 is delivered directly into the exhaust system via an open inlet valve and an open outlet valve while the engine is stationary. Electric-motor operation of the ET 10 thus enables charge air to be delivered to the internal combustion engine and to be heated by the activated cold-starting aid 6, despite the engine being stationary and without turbine energy from the combustion air of the internal combustion engine. The setting of the valve overlap and/or of a charge-exchange position between at least one inlet valve and at least one outlet valve of a working cylinder has the effect that the heated charge air flows into the corresponding working cylinder with a valve overlap and is scavenged to the exhaust side via the outlet valve. As a result, the working cylinder, on the one hand, and the exhaust gas aftertreatment system, in particular the exhaust gas aftertreatment catalyst, on the other hand, are pre-warmed.

The internal combustion engine 3 is then started in step S5.

Figure 3A:
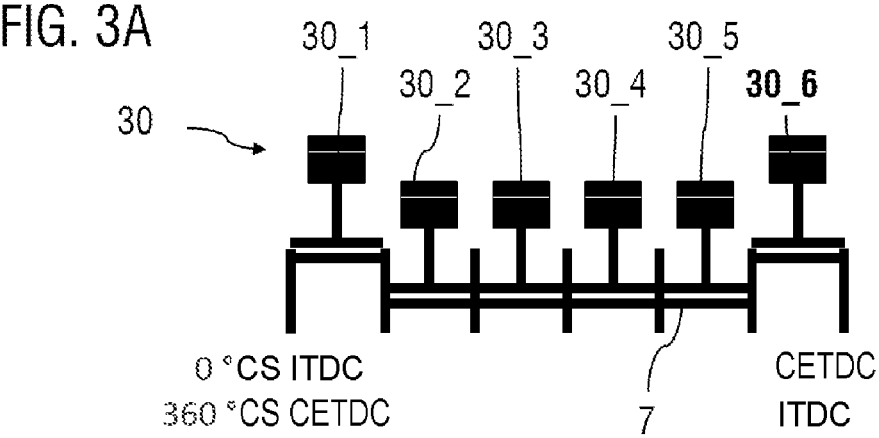
FIGS. 3A, 3B and 3C are schematic diagrams showing, by way of example, the activation of the crankshaft for the purpose of setting the valve overlap for an in-line six-cylinder engine according to one embodiment of the invention.
Figure 3B:
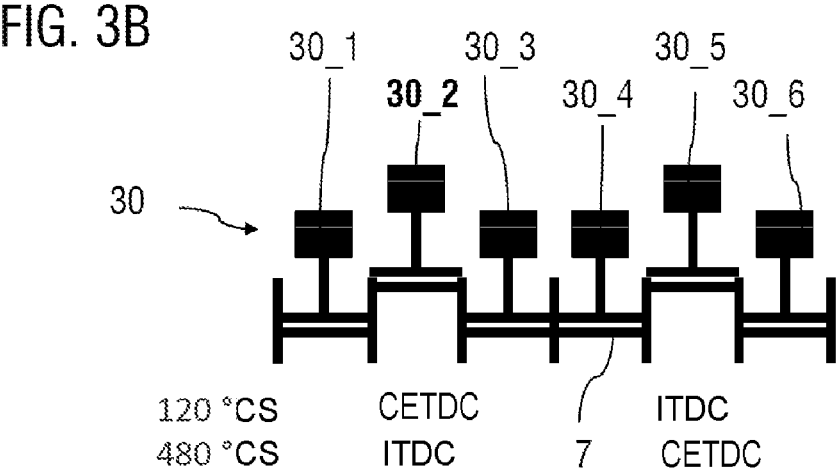
Figure 3C:
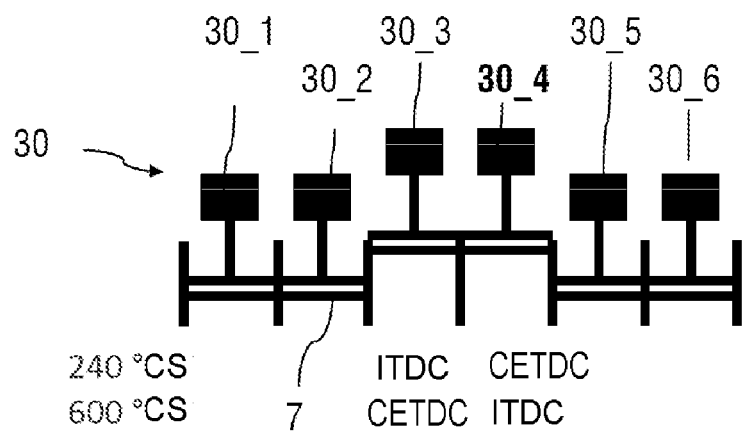

FIGS. 3A, 3B and 3C illustrate by way of example the activation of the crankshaft 7 for the purpose of setting the valve overlap for an in-line six-cylinder engine according to one embodiment of the invention. The individual cylinders 30 are denoted by the reference signs 30_1 to 30_6.

According to this variant embodiment, the crankshaft (CS) 7 is turned successively three times, in each case by 120°, while the engine is stationary in step S4 for the setting of the valve overlap in order in each case to set one of two synchronized working cylinders 30 that are the next to be ignited during the starting process to the charge-exchange top dead centre position (CETDC, TDC=top dead centre).

FIG. 3A shows a first rotational position 0° of the crankshaft 8, in which the pistons of cylinders 30_1 and 30_6 are in the top dead centre position (TDC), wherein the first cylinder 30_1 is in the position of ignition TDC (ITDC, between the compression stroke and the power stroke) and the sixth cylinder 30_6 is in the position of charge-exchange TDC (CETDC, between the exhaust stroke and the intake stroke).

FIG. 3B shows a subsequent crankshaft position, the result of turning further by 120° by the control device through activation of the CSG 8 in step S4. Consequently, the second cylinder 30_2 is now at CETDC and the fifth cylinder is at ITDC. FIG. 3C shows a third crankshaft position, wherein the crankshaft 7 has been turned by a further 120° by the control device 1 in step S4 through activation of the CSG 8. Consequently, the third cylinder 30_3 is at ITDC and the fourth cylinder is at CETDC.

In the CETDC position, the inlet valve and the outlet valve of the corresponding cylinder are in valve overlap. Consequently, cylinders 30_6, 30_2 and then 30_4 are preheated in succession. During the subsequent starting process, these are also the next cylinders 30 to be ignited, which have already been preheated, improving their ignition behaviour.

The invention is not restricted to the above-described preferred illustrative embodiments. On the contrary, a multiplicity of variants and modifications is possible, which likewise make use of the inventive concept and therefore fall within the scope of protection. In particular, the invention also claims protection for the subject matter and the features of the dependent claims independently of the claims to which they refer.

LIST OF REFERENCE SIGNS 1 control device
2 control line
3 internal combustion engine
4 charge air cooler
5 charge air line
6 flame-starting device
7 crankshaft
8 crankshaft starter generator
10 exhaust turbocharger that can be operated by electric motor
11 compressor
12 turbine
13 shaft
14 electric motor
15 control of the exhaust turbocharger
15 electric energy storage device
17a, 17b lines for energy transfer
18a charge air duct
18b charge air line
19 exhaust line
30, 30_1 to 30_6 working cylinder
CETDC charge-exchange TDC, TDC=top dead centre
ITDC ignition TDC, TDC=top dead centre

What is claimed is:

1. A method for cold-start pre-warming at least one of a pressure-charged internal combustion engine and an exhaust gas aftertreatment device of the internal combustion engine,
   wherein a cold-starting aid is arranged in an intake duct and warms charge air while the internal combustion engine is stationary, and
   wherein the internal combustion engine comprises at least one working cylinder, which in each case has at least one inlet valve, which is connected to the intake duct, and at least one outlet valve, which is connected to an exhaust system, and further comprises a setting device for setting a valve position, and a pressure-charging device operable by an electric motor;
   the method, comprising the steps of
   detecting a cold start of the internal combustion engine; and
   after the detecting of the cold start,
   activating the cold-starting aid while the engine is stationary;
   activating operation of the pressure-charging device using the electric motor; and
   setting, by the setting device, a valve overlap between at least one inlet valve and at least one outlet valve of a working cylinder to deliver at least some of the charge air delivered by the pressure-charging device and pre-warmed by the cold-starting aid directly into the exhaust system.

2. The method according to claim 1, wherein the pressure-charging device operable by the electric motor is one of an exhaust turbocharger with electric motor assistance and an electric compressor.

3. The method according to claim 1, wherein the cold-starting aid is one of a flame-starting device, a glow plug, and a glow grid.

4. The method according to claim 1, wherein the setting device for setting the valve position sets at least one predetermined angular position of the crankshaft, which produces the valve overlap and which, for this purpose, activates a starter motor of the internal combustion engine or a crankshaft starter generator.

5. The method according to claim 1, wherein the internal combustion engine includes an electromagnetic valve gear, which is activated by the setting device to set the valve overlap.

6. The method according to claim 1, wherein the internal combustion engine is equipped with at least two camshafts and at least one camshaft phase adjuster, at least one of the camshaft phase adjusters is activated in such a way as to increase the valve overlap in the step of setting.

7. The method according to claim 1, wherein in the step of setting the valve overlap, the valve overlap is in each case set in succession for the next working cylinder or cylinders to be ignited during the starting process.

8. The method according to claim 1, wherein the internal combustion engine is embodied as an in-line six-cylinder engine and, in the step of setting the valve overlap, the crankshaft is turned three times in succession, in each case by 120°, in each case to set one of two synchronized working cylinders that are the next to be ignited during the starting process to the charge-exchange top dead center position (CETDC).

9. The method according to claim 1, wherein in the step of setting the valve overlap, a slow continuous crankshaft rotation takes place while the engine is stationary.

10. The method according to claim 1, wherein the internal combustion engine operates with self-ignition.

11. The method according to claim 10, wherein the internal combustion engine is a diesel engine.

12. A motor vehicle, comprising
an internal combustion engine having an intake duct, at least one working cylinder, which in each case has at least one inlet valve, which is connected to the intake duct, and at least one outlet valve, which is connected to an exhaust system;
a pressure-charging device, which can be operated by electric motor, for pressure-charging the internal combustion engine;
a setting device for setting an internal combustion engine having an intake take valve position of the working cylinders of the internal combustion engine;
an exhaust gas aftertreatment device;
a cold-starting aid, arranged in the intake duct, for warming the charge air while the engine is stationary; and
a control device for cold-start pre-warming of at least one of the internal combustion engine and of the exhaust gas aftertreatment device while the engine is stationary, using the method according to claim 1.

\* \* \* \* \*